United States Patent [19]

Sybert

[11] Patent Number: 4,831,088
[45] Date of Patent: May 16, 1989

[54] EPOXIDE-FUNCTIONALIZED POLYPHENYLENE ETHERS AND METHOD OF PREPARATION

[75] Inventor: Paul D. Sybert, Pittsfield, Mass.

[73] Assignee: General Electric Company, Schenectady, N.Y.

[21] Appl. No.: 103,466

[22] Filed: Oct. 1, 1987

Related U.S. Application Data

[60] Division of Ser. No. 885,112, Jul. 14, 1986, Pat. No. 4,732,937, which is a continuation-in-part of Ser. No. 866,661, May 27, 1986, abandoned.

[51] Int. Cl.$^4$ .............................................. C08L 71/04
[52] U.S. Cl. ................................... 525/396; 525/391; 525/397; 525/534; 525/905
[58] Field of Search ............... 525/396, 397, 391, 395, 525/534, 905

[56] References Cited

U.S. PATENT DOCUMENTS 4,315,086 2/1982 Ueno .................................. 525/391
4,614,773 9/1986 Suzio .................................. 525/391

Primary Examiner—Patricia Short
Attorney, Agent, or Firm—William H. Pittman; James C. Davis, Jr.

[57] ABSTRACT

Epoxide-functionalized polyphenylene ethers, which may be prepared by the reaction of various acid-functionalized polyphenylene ethers with functionalized epoxides, are useful in the preparation of polyphenylene ether copolymers. These copolymers are, in turn, useful for the compatibilization of blends of polyphenylene ethers with such other polymers as polyesters and polyamides.

6 Claims, No Drawings

EPOXIDE-FUNCTIONALIZED POLYPHENYLENE ETHERS AND METHOD OF PREPARATION

This application is a division of copending application Ser. No. 885,112, filed July 14, 1986, now U.S. Pat. No. 4,732,937, which is a continuation-in-part of application Ser. No. 866,661, filed May 27, 1986, now abandoned.

This invention relates to functionalized polyphenylene ethers and their preparation and use.

The polyphenylene ethers are a widely used class of thermoplastic engineering resins characterized by excellent hydrolytic stability, dimensional stability and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are polyamides and linear polyesters, including poly(alkylene dicarboxylates). However, such blends frequently undergo phase separation and delamination. They typically contain large, incompletely dispersed polyphenylene ether particles and no phase interaction between the two resin phases. Molded parts made from such blends are typically characterized by extremely low impact strength.

A principal object of the present invention, therefore, is to prepare novel polyphenylene ether compositions.

A further object is to prepare functionalized polyphenylene ethers which are capable of compatibilizing blends of polyphenylene ethers with such polymers as polyamides and linear polyesters.

A still further object is to prepare novel polyphenylene ether-polyamide compositions with desirable properties.

Other objects will in part be obvious and will in part appear hereinafter.

In one of its aspects, the present invention is directed to epoxide-functionalized polyphenylene ethers containing at least one moiety having the formula

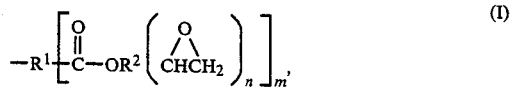

wherein $R^1$ is a divalent bridging radical containing at least one hydrocarbon group, $R^2$ is a polyvalent bridging radical containing at least one hydrocarbon group, m is from 1 to about 5 and n is from 1 to about 10.

The polyphenylene ethers (also known as polyphenylene oxides) used in this invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

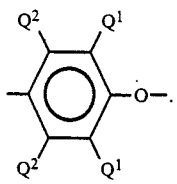

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially C1-4 alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-di-methyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pats. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds and ω-hydroxyoximes.

Among the polyphenylene ethers which are useful for the purposes of this invention are those which comprise molecules having at least one of the end groups of the formula

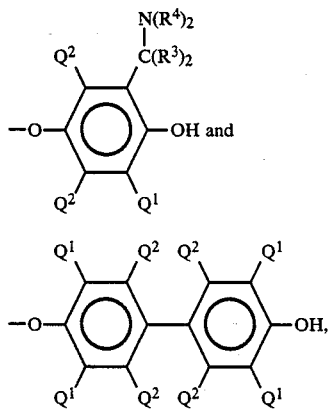

wherein $Q^1$ and $Q^2$ are as previously defined; each $R^3$ is independently hydrogen or alkyl, with the proviso that the total number of carbon atoms in both $R^3$ radicals is 6 or less; and each $R^4$ is independently hydrogen or a C1-6 primary alkyl radical. Preferably, each $R^3$ is hydrogen and each $R^4$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

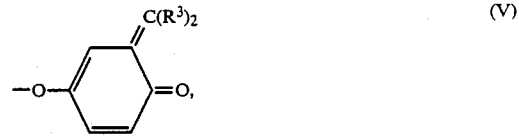

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

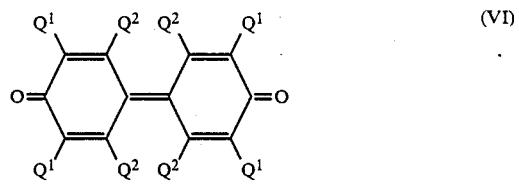

is present, especially in a copper-halide-secondary or tertiary amine system. In this regard, the disclosures of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The polyphenylene ether is linked to the structure shown in formula I. The $R^1$ values in that formula may be polyvalent (i.e., divalent or greater) aliphatic, alicyclic or aromatic hydrocarbon radicals, substituted hydrocarbon radicals or radicals containing at least one non-carbon linking atom, provided they contain at least one hydrocarbon group. Illustrative linking atoms are oxygen and sulfur, with oxygen being preferred. Illustrative substituents are hydroxy, halo, nitro, alkoxy, carboxy, carbalkoxy and carbaryloxy. They may be relatively low molecular weight radicals or polymeric radicals, the formula weight of the latter typically being up to about 500.

The $R^2$ values may be generically defined in a manner similar to $R^1$. They may also be low molecular weight or polymeric radicals, the latter generally having a formula weight up to about 1000.

The value of m may be from 1 to about 5. It is usually 1, but values higher than 1 are possible by reason, for example, of the possibility of grafting involving more than one maleic anhydride moiety at a single site on the polyphenylene ether molecule. Similarly, n may be greater than 1 when the epoxide reactant is a polyepoxy compound such as an epoxy novolak resin. Most often, n is from 1 to 5.

The moieties of formula I may be linked to the polyphenylene ether in various ways, depending on reactants and conditions as described hereinafter. For example, reactions involving the use of such compounds as terephthaloyl chloride or trimellitic anhydride acid chloride will result in a bond with one or both terminal oxygen atoms of the polyphenylene ether. The compositions thus obtained, which are often preferred for the purposes of the invention, may be represented by the formula

wherein A is a polyphenylene ether moiety, $R^2$ is as previously defined, $R^5$ is a divalent aliphatic, alicyclic or aromatic hydrocarbon or substituted hydrocarbon radical and p is 1 or 2. Compositions of formula VII are frequently preferred, especially when $R^2$ is C1–4 alkylene and most desirably methylene and $R^5$ is an aromatic hydrocarbon radical and most desirably p-phenylene.

Maleic anhydride and fumaric acid, on the other hand, are believed to react with polyphenylene ethers via grafting on the $Q^1$ groups or the aromatic rings, forming one or more aliphatic groups attached to the polyphenylene ether by carbon-carbon bonds. In general, an average of about 1-5 moieties of formula I are then present per polyphenylene ether molecule.

The epoxide-functionalized polyphenylene ethers of this invention may be prepared by the reaction of an acidfunctionalized polyphenylene ether with a functionalized epoxide. Suitable functionalized epoxides include, for example, hydroxy-substituted compounds of the formula

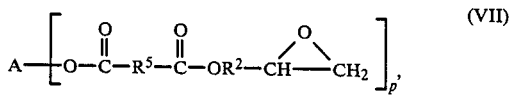

Glycidol is a particularly preferred functionalized epoxide.

Also suitable as functionalized epoxides are polyepoxy compounds such as bisphenol A diglycidyl ether, glycidyl methacrylate polymers and epoxy novolaks. Their use may result in the formation of a composition containing moieties of formula I wherein n is greater than 1, and wherein $R^2$ is a polymeric moiety.

For example, "D.E.N. 485" is the designation of an epoxy novolak commercially available from Dow Chemical Company, which may be represented by the formula

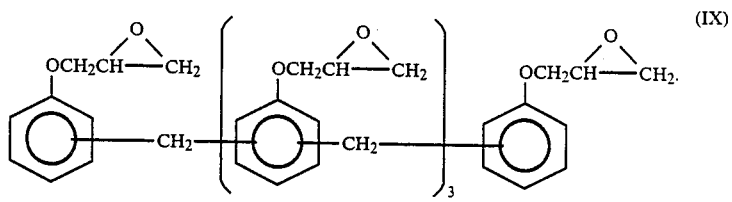

Its reaction with a maleic anhydride-functionalized polyphenylene ether produces a composition in which a portion of the $R^2$ moiety is derived from the epoxy novolak of formula IX and the remainder from the maleic anhydride.

The term "acid-functionalized polyphenylene ether", as used herein, generically denotes the reaction product of a polyphenylene ether with any of various carboxylic acids or functional derivatives thereof, including salts, esters, anhydrides, amides and imides. One method of preparing acid-functionalized polyphenylene ethers is by reaction of the polymer with at least one compound containing (a) a carbon-carbon double or triple bond, hydroxy group, alkoxy group, aryloxy group or acyl halide group, and also (b) a carboxylic acid, acid salt, acid anhydride, acid amide, acid ester or imido group. A wide variety of such compounds are suitable for this purpose. Many illustrative compounds are listed in U.S. Pat. No. 4,315,086, the disclosure of which is incorporated by reference herein. They include maleic, fumaric, itaconic and citraconic acids and their derivatives, various unsaturated fatty oils and the acids derived therefrom, relatively low molecular weight olefinic acids such as acrylic acid and its homologs, and the like.

Another class of acid-functionalized polyphenylene ethers is disclosed in copending, commonly owned application Ser. No. 780,151, filed Sept. 26, 1985, the disclosure of which is also incorporated by reference herein. The compositions in this class are prepared by reaction of the polyphenylene ether with a compound of the formula

wherein $R^6$ is an aromatic or saturated aliphatic radical, $X^1$ is halogen (especially chlorine) and $X^2$ is one or two carboxylic acid, acid salt, acid amide or acid ester groups or a dicarboxylic acid anhydride or imide group. Illustrative compounds of this type are carboxymethylsuccinic anhydride acid chloride and trimellitic anhydride acid chloride (TAAC).

Particularly preferred functionalizing agents are maleic acid and its derivatives (especially maleic anhydride), fumaric acid, trimellitic anhydride acid chloride and terephthaloyl chloride.

These functionalizing agents may be reacted with the polyphenylene ether by heating a mixture thereof, typically at a temperature within the range of about 80°–390° C., in solution or in the melt and preferably the latter. In general, about 0.01-2.0, most often about 0.3-1.0 and preferably about 0.5-1.0 parts (by weight) of said functionalizing agent is employed per 100 parts of polyphenylene ether. The reaction may conveniently be carried out in an extruder or similar equipment.

The reaction of the acid-functionalized polyphenylene ether with the functionalized epoxide takes place under conditions known in the art for the type of reaction involved. For example, acid-functionalized polyphenylene ethers containing acyl chloride groups react with glycidol at temperatures as low as −50° C. under certain conditions; in any event, temperatures in the range of about 20°-50° C. are satisfactory. On the other hand, reaction of an epoxy novolak with a carboxylic acid or anhydride may require temperatures in the range of about 100°-250° C.

The proportion of functionalized epoxide is generally about 1-10 and preferably about 3-6 parts by weight per 100 parts of acid-functionalized polyphenylene ether. The reaction is generally conveniently conducted in a solvent, suitable solvents being aromatic hydrocarbons such as toluene and xylene, chlorinated aromatic hydrocarbons such as chlorobenzene, and compounds having solvent properties similar thereto.

The preparation of the epoxide-functionalized polyphenylene ethers of this invention is illustrated by the following example. The polyphenylene ether used in the examples herein was an unfunctionalized poly-(2,6-dimethyl-1,4-phenylene ether) having a number average molecular weight of about 20,000, an intrinsic viscosity (IV) in chloroform at 25° C. of 0.48 dl./g. and 0.084% (by weight) hydroxy groups.

EXAMPLE 1

To a solution of 325 grams of polyphenylene ether in 3 liters of toluene was added a solution of 16.53 grams (81.4 mmol.) of terephthaloyl chloride in 250 ml. of toluene. The mixture was stirred for 16 hours, after which 16.7 grams (165 mmol.) of triethylamine was added. Stirring was continued for 4 hours, after which 15.3 grams (207 mmol.) of glycidol was added and stirring was continued for 3 days. The product was precipitated by addition of methanol, redissolved in toluene and reprecipitated, and dried under reduced pressure. It was shown by infrared spectroscopy to be the desired epoxide-functionalized polyphenylene ether, and by analysis to contain 0.0014% (by weight) hydroxy groups.

EXAMPLE 2

A mixture of 99 parts of polyphenylene ether and 1 part of maleic anhydride is extruded on a single-screw extruder at temperatures in the range of 120°-330 C. The extrudate, comprising the desired maleic anhydride-functionalized polyphenylene ether, is quenched in water, pelletized, dissolved in chloroform, precipitated with methanol, filtered and vacuum dried at 60° C.

A solution in 85 ml. of 1,2,4-trichlorobenzene of 5 grams of the maleic anhydride-functionalized polyphenylene ether and 5 grams of "D.E.N. 485" is heated at 200° C., under nitrogen, for 16 hours. Toluene, 100 ml., is added and the mixture was heated under reflux for ½ hour and cooled. The solids are removed by centrifugation, washed with toluene and again centrifuged and dried. The product is the desired epoxide-functionalized polyphenylene ether.

As previously indicated, the epoxide-functionalized polyphenylene ethers of this invention are useful in the preparation of compatibilized blends of polyphenylene ethers with such polymers as polyamides and linear polyesters. In particular, said functionalized polyphenylene ethers form copolymers with polyesters and polyamides, which may be used for compatibilization of such blends. Compositions comprising polyphenylene ether-polyester copolymers are disclosed and claimed in the aforementioned application Ser. No. 866,661, filed May 27, 1986.

Another aspect of the invention is resinous compositions comprising at least one polyphenylene ether and at least one polyamide, at least a portion of said polyphenylene ether being an epoxide-functionalized polyphenylene ether of this invention. It is within the scope of the invention to include both functionalized and unfunctionalized polyphenylene ether in said composition, the latter being present in an amount up to about 90% by weight of total polyphenylene ether.

Polyamides suitable for use in said compositions may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functinal derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH—group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula

H2N(CH2)$_n$NH2 wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

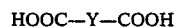

HOOC—Y—COOH wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

Typical examples of the polyamides or nylons, as these are often called, include, for example, polyamide-6, 66, 11, 12, 63, 64, 6/10 and 6/12 as well as polyamides from terephthalic acid and/or isophthalic acid and trimethylhexamethylenediamine; from adipic acid, azelaic acid and 2,2-bis-(p-aminocyclohexyl)propane and from terephthalic acid and 4,4'-diaminocyclohexylmethane Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

Among the linear polyesters which are useful in preparing copolymers with the epoxide-functionalized polyphenylene ethers are the poly(alkylene dicarboxylates). They typically comprise at least 30 and most often at least 50 structural units, usually of the formula

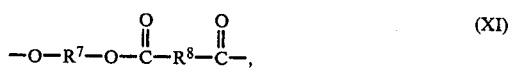

wherein $R^7$ is a divalent aliphatic or alicyclic radical containing about 2-10 carbon atoms and $R^8$ is a divalent aliphatic, alicyclic or aromatic radical containing about 2-10 and usually about 6-10 carbon atoms.

Such polyesters are typically prepared by the known reaction of dihydroxy compounds with dicarboxylic acids or functional derivatives thereof such as anhydrides, acid chlorides or lower alkyl (especially methyl) esters, preferably the esters.

The $R^7$ radicals may be one or more aliphatic or alicyclic hydrocarbon radicals, alicyclic radicals being known to those skilled in the art to be equivalent to aliphatic radicals for the purpose of the invention. They may be derived from such dihydroxy compounds as ethylene glycol, 1,4-butanediol (both of which are preferred), propylene glycol, 1,3-propanediol, 1,6-hexanediol, 1,10-decanediol, 1,4-cyclohexanedimethanol and 2-butene-1,4-diol. They may also be radicals containing substituents which do not substantially alter the reactivity of the dihydroxy compound (e.g., alkoxy, halo, nitrile) or hetero atoms (e.g., oxygen or sulfur). The $R^7$ radicals are usually saturated.

The $R^8$ radicals may be derived from such acids as succinic, adipic, maleic, isophthalic and terephthalic acids or similar substituted and hetero atom-containing acids.

Most often, $R^7$ and $R^8$ are hydrocarbon radicals, typically containing about 2-10 carbon atoms. Preferably, $R^7$ is aliphatic and $R^8$ is aromatic. The polyester is most desirable a poly(alkylene terephthalate), particularly poly(ethylene terephthalate) or poly(1,4-butylene terephthalate) (hereinafter sometimes simply "polyethylene terephthalate" and "polybutylene terephthalate", respectively) and especially the latter. Such polyesters are known in the art as illustrated by the following patents: U.S. Pat. Nos. 2,465,319; 2,720,502; 2,727,881; 2,822,348; 3,047,539; 3,671,487; 3,953,394; 4,128,526. The polyesters most often have number average molecular weights in the range of about 10,000-70,000, as determined by intrinsic viscosity (IV) at 30° C. in a mixture of 60% (by weight) phenol and 40% 1,1,2,2-tetrachloroethane.

It is also contemplated to employ elastomeric polyesters. Such polyesters are known in the art; they are exemplified by compositions in which a portion of the $R^7$ values are soft segment radicals such as polyoxyalkylene (typically polyoxyethylene or polyoxytetramethylene) and units derived from lactones such as Σ-caprolactone. Numerous elastomeric polyesters of this type are commercially available; they include those sold by DuPont under the trademark Hytrel and by General Electric under the trademark Lomod.

To prepare the copolymer compositions, the epoxide-functionalized polyphenylene ether and polyester or polyamide are heated together in solution or in the melt. The reaction temperature is typically within the range of about 100°-350° C., preferably about 150°-290° C. for polyesters. The proportions of epoxide-functionalized polyphenylene ether and polyester or polyamide are not critical and may be adjusted over a wide range to yield copolymer compositions having the desired properties. The polyphenylene etherpolyamide compositions, however, generally contain about 5-75% by weight polyphenylene ether and about 25-95% polyamide.

In general, the copolymer compositions comprise only partially copolymer, with the balance being a polyphenylene ether-polyester or polyamide blend. The approximate proportion of copolymer in the composition may often be conveniently expressed as the percentage of copolymerized polyphenylene ether based on total polyester or polyamide. It may be determined by extracting unreacted polyphenylene ether with a suitable solvent, typically toluene or chloroform, and analyzing the insoluble residue (copolymer and residual polyester or polyamide) by proton nuclear magnetic resonance.

It is frequently preferred to maximize the proportion of carboxy end groups in the polyester. This may frequently be accomplished by preextruding the polyester, typically at a temperature in the range of about 250°-300° C. Under these conditions, there is apparently a loss by degradation and volatilization of hydroxy end group functionality, producing a polymer with a high proportion of carboxy end groups.

The preparation of polyphenylene ether-polyester copolymer compositions is illustrated by the following examples.

EXAMPLE 3

A solution of 250 grams of a poly(butylene terephthalate) having a number average molecular weight of about 40,000 and a carboxy end group concentration of 24.7 microequivalents per gram in 3.8 liters of 1,2,4-trichlorobenzene was heated to 200° C. and 250 grams of the epoxide-functionalized polyphenylene ether of Example 1 was added under nitrogen, with stirring. Stirring at 200° C. was continued for 60 hours, after which the copolymer composition was precipitated by pouring into acetone, extracted with methanol and dried under vacuum. Analysis showed the presence of 28% copolymerized polyphenylene ether.

EXAMPLE 4

The procedure of Example 3 was repeated, using a polyester which had been preextruded on a twin-screw extruder at about 260° C., and which had a carboxylate end group concentration of 34.3 microequivalents per gram. Analysis showed the presence of 39% copolymerized polyphenylene ether.

As previously mentioned, the above-described copolymer compositions, and polyphenylene ether-poly(ester or amide) blends in which they are incorporated, have high impact strength, good solvent resistance and other advantageous properties. These properties make them useful for the preparation of molded and extruded articles.

The weight ratio of polyester or polyamide to total polyphenylene ether in the copolymer-containing blend is generally in the range of about 0.5–3.0:1, most often about 0.9–2.5:1. The proportion of copolymerized polyphenylene ether therein is capable of wide variation, essentially any quantity thereof affording some improvement in properties. For the most part, said proportion is in the range of about 10–80% by weight of total resinous components.

The blends may also contain ingredients other than the copolymer, polyphenylene ether and polyester or polyamide. A particularly useful other ingredient in many instances is at least one elastomeric impact modifier which is compatible with the polyphenylene ether. It is generally present in the amount of about 5–25% by weight of resinous components.

Impact modifiers for polyphenylene ether-polyester or polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, ethylene-acrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include, for example, modified and unmodified polystyrenes, ABS type graft copolymers, AB and ABA type block and radial block copolymers and vinyl aromatic conjugated diene coreshell graft copolymers. Modified and unmodified polystyrenes include homopolystyrenes and rubber modified polystyrenes, such as butadiene rubber-modified polystyrene (otherwise referred to as high impact polystyrene or HIPS). Additional useful polystyrenes include copolymers of styrene and various monomers, including, for example, poly(styreneacrylonitrile) (SAN), styrene-butadiene copolymers as well as the modified alpha-and para-substituted styrenes and any of the styrene resins disclosed in U.S. Pat. No. 3,383,435, herein incorporated by reference. ABS types of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylacrylic acids and their esters.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Pat. No. 1,264,741, all incorporated herein by reference. Exemplary of typical species of AB block copolymers there may be given:
polystyrene-polybutadiene (SBR)
polystyrene-polyisoprene and
poly(alpha-methylstyrene)-polybutadiene.
Such AB block copolymers are available commercially from a number of sources, including Phillips Petroleum under the trademark Solprene.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include:
polystyrene-polybutadiene-polystyrene (SBS),
polystyrene-polyisoprene-polystyrene (SIS),
poly(α-methylstyrene)-polybutadiene-poly-(α-methylstyrene) and
poly(α-methylstyrene)-polyisoprene-poly-(α-methylstyrene).
Particularly preferred triblock copolymers are available commercially as Cariflex ®, Kraton D ® and Kraton G ® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, butadiene-glycidyl methacrylate copolymers, isoprene-isobutylene copolymers, chlorobutadiene polymers, butadieneacrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pats. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; ,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as Geloy ™ resin and described in U.S. Pat. No. 3,944,631. Especially for polyester blends, the core-shell elastomers containing, for example, a poly(alkyl acrylate) core attached to a polystyrene shell via an interpenetrating network are frequently useful; they are more fully disclosed in copending, commonly owned application Ser. No. 811,808, now U.S. Pat. No. 4,681,915, filed Dec. 20, 1985.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic etherester elastomers.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000–300,000. Block copolymers of this type are commercially available from Shell Chemical Company under the trademark Kraton, and include Kraton D1101, G1650, G1651, G1652, G1657 and G1702.

Other conventional ingredients which may be present in the copolymer-containing blends include fillers, flame retardants, colorants, stabilizers, antistatic agents, mold release agents and the like, used in conventional amounts. The presence of other resinous components is also contemplated. These include impact modifiers compatible with the polyester, such as various graft and core-shell copolymers of such monomers as butadiene, styrene, butyl acrylate and methyl methacrylate. The presence of such copolymers frequently improves the low-temperature ductility of the blends.

The preparation of copolymer-containing blends is normally achieved under conditions adapted for the formation of an intimate resin blend. Such conditions often include extrusion, typically at temperatures in the range of about 100°–300° C. and otherwise under the conditions previously described. Extrusion may be conveniently effected in a screw-type or similar extruder which applies a substantial shearing force to the composition, thereby decreasing the particle size thereof. It is sometimes found that the impact strength of the composition is increased if it is extruded more than once, thereby insuring effective blending.

The preparation and properties of polyphenylene ether-polyester and polyamide blend compositions are illustrated by the following examples.

EXAMPLE 5

A resin blend was prepared by extrusion, under conventional conditions in a twin-screw extruder, of a mixture of 75.4 parts of the composition of Example 3, 0.5 part of unfunctionalized polyphenylene ether, 14.1 parts of the poly(butylene terephthalate) used as a reactant in Example 3, and 10 parts of a commercially available triblock copolymer in which the polystyrene end blocks have weight average molecular weights of 29,000 and the ethylene/butylene midblock has a weight average molecular weight of 116,000. It had the following physical properties.

Izod impact strength (notched)—753 joules/m.
Tensile strength at yield—43.9 MPa.
Tensile strength at break—40.9 MPa.
Elongation at break—130%
Tensile modulus-0.77 GPa.

EXAMPLE 6

A mixture of 49 parts of the epoxide-functionalized polyphenylene ether of Example 1, 41 parts of a commercially available polyamide-66 and 10 parts of an impact modifier was tumble mixed in a jar mill and extruded at 120°–330° C. and 400 rpm., using a twin-screw extruder. The impact modifier was a commercially available styrene-ethylene/butylene styrene triblock copolymer in which the weight average molecular weights of the end blocks and midblock are 29,000 and 116,000, respectively.

The extrudate was quenched in water, pelletized and dried in a vacuum oven at 100° C. It was then injection molded into notched Izod test specimens at 300° C. and 1100 psi. The Izod impact strength of the specimens was 144 joules/m.

What is claimed is:

1. An epoxide-functionalized polyphenylene ether composition having the formula

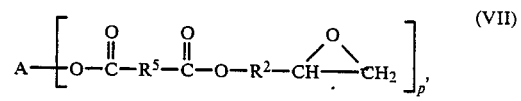

wherein A is a polyphenylene ether moiety, $R^2$ is a $C_{1-4}$ alkylene radical, $R^5$ is a divalent aliphatic, alicyclic or aromatic hydrocarbon or substituted hydrocarbon radical and p is 1 or 2.

2. A composition according to claim 1 wherein the polyphenylene ether comprises a plurality of structural units having the formula

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A composition according to claim 2 wherein the polyphenylene ether is a poly(2,6-dimethyl-1,4-phenylene ether).

4. A composition according to claim 3 wherein $R^5$ is an aromatic hydrocarbon radical.

5. A composition according to claim 4 wherein $R^2$ is methylene.

6. A composition according to claim 4 wherein $R^5$ is p-phenylene.

* * * * *